(12) United States Patent
Hutchinson et al.

(10) Patent No.: US 11,734,202 B2
(45) Date of Patent: Aug. 22, 2023

(54) SENSOR INTERFACE

(71) Applicant: Baker Hughes Oilfield Operations LLC, Houston, TX (US)

(72) Inventors: Andrew Walter Hutchinson, Richmond, VA (US); Declan Doherty, Leicester (GB)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/406,882

(22) Filed: Aug. 19, 2021

(65) Prior Publication Data

US 2022/0083477 A1    Mar. 17, 2022

Related U.S. Application Data

(60) Provisional application No. 63/079,546, filed on Sep. 17, 2020.

(51) Int. Cl.
*G06F 13/12* (2006.01)
*G06F 13/42* (2006.01)
*G01D 3/036* (2006.01)
*G01D 21/02* (2006.01)

(52) U.S. Cl.
CPC ........ *G06F 13/122* (2013.01); *G06F 13/4282* (2013.01)

(58) Field of Classification Search
CPC . G06F 13/122; G06F 13/4282; G01D 3/0365; G01D 21/02
USPC .................................. 710/15, 32, 36, 62, 69
See application file for complete search history.

(56) References Cited

U.S. PATENT DOCUMENTS

| | | | | | |
|---|---|---|---|---|---|
| 4,770,842 | A | * | 9/1988 | Kelly | G08C 15/04 376/217 |
| 5,574,645 | A | * | 11/1996 | Meeker | G01L 27/007 701/99 |
| 7,043,293 | B1 | * | 5/2006 | Baura | A61B 5/7264 600/509 |
| 7,362,255 | B1 | * | 4/2008 | Tsyrganovich | H03M 3/34 341/172 |
| 2003/0216863 | A1 | * | 11/2003 | Fielder | G01S 19/37 342/357.42 |
| 2008/0307134 | A1 | * | 12/2008 | Geissler | G06F 13/4291 710/110 |
| 2011/0276820 | A1 | * | 11/2011 | Patel | G06F 1/12 713/400 |

(Continued)

*Primary Examiner* — Farley Abad
*Assistant Examiner* — Henry W Yu
(74) *Attorney, Agent, or Firm* — Mintz Levin Cohn Ferris Glovsky and Popeo, PC (57) ABSTRACT

A system including a sensor interface for determining a substitute frequency value via a sensor interface is provided. The system can include a first circuit receiving a frequency signal. The system can also include a sensor interface coupled to the first circuit and configured to determine a substitute frequency value based on the frequency signal. The system can also include a second circuit providing the substitute frequency value output from the sensor interface. The second circuit can provide the substitute frequency value in place of an analog input value by mimicking the behavior of an analog-to-digital converter. An apparatus including the sensor interface and methods of determining the substitute frequency value using a sensor interface are also provided.

18 Claims, 5 Drawing Sheets

(56) References Cited

U.S. PATENT DOCUMENTS

| | | | |
|---|---|---|---|
| 2014/0241410 A1* | 8/2014 | Dark | H04B 1/123 |
| | | | 375/350 |
| 2016/0378153 A1* | 12/2016 | Kelly | G06F 13/4022 |
| | | | 713/300 |
| 2018/0013387 A1* | 1/2018 | Fells | H03M 1/60 |
| 2018/0189212 A1* | 7/2018 | Harpak | G06F 1/10 |
| 2019/0074958 A1* | 3/2019 | Liao | H04L 7/0012 |
| 2019/0339311 A1* | 11/2019 | Guzman | G01R 19/1658 |
| 2021/0060963 A1* | 3/2021 | Jeran | H04L 12/12 |

\* cited by examiner

SENSOR INTERFACE

CROSS-REFERENCE TO RELATED APPLICATIONS

The present application claims the benefit of and priority under 35 U.S.C. § 119(e) to U.S. Provisional Application No. 63/079,546 entitled "Sensor Interface" filed on Sep. 17, 2020, which is hereby expressly incorporated by reference in its entirety.

BACKGROUND

Sensors can be coupled to industrial equipment to monitor an operating characteristic of the industrial equipment. Sensors can include electrical circuits configured to output signal data associated with the operating characteristic being sensed by the sensor. Sensors can output various forms of data to host systems. For example, the sensor data that is provided to host systems can include voltage data and/or frequency data. Host systems receiving sensor data in one format may be unable to process sensor data received in another format due to interface format requirements configured on the host system. A flexible sensor interface can enable a broader variety of sensor types and sensor data to be configured with a host system in order to mitigate obsolescence of unsupported sensors.

SUMMARY

In one aspect, a system is provided. In one embodiment, the system can include a first circuit receiving a frequency signal. The system can also include a sensor interface coupled to the first circuit and configured to determine a substitute frequency value based on a number of edge occurrences of the frequency signal that can occur during a sampling period. The substitute frequency value can be determined responsive to a read command provided by a host system coupled to the sensor interface. The read command can be provided on an analog channel associated with a frequency input of the host system. The read command can be provided to an analog-to-digital converter coupled to the sensor interface and to the host system. The system can further include a second circuit providing the substitute frequency value output from the sensor interface. The substitute frequency value can be provided in place of an analog voltage signal output from the analog-to-digital converter to the host system.

In another embodiment, the system can include a sensor. The frequency signal can be provided by the sensor. In another embodiment, the sensor can be a pressure sensor. In another embodiment, the sensor interface can be configured on a FPGA, an ASIC, a gate array, or a CPLD. In another embodiment, the frequency signal can be between 20 kHz and 40 KHz.

In another embodiment, the system can include the analog-to-digital converter and the sensor interface can include a timing unit providing a timing signal. The sensor interface can also include a frequency-to-digital converter receiving the frequency signal and the timing signal. The sensor interface can also include a channel detector circuit. The sensor interface can also include a pass thru circuit providing the substitute frequency value to the second circuit.

In another embodiment, the frequency-to-digital converter can sample the frequency signal during a sampling period included in the timing signal and can determine the substitute frequency value based on a duration of time corresponding to a number of edge occurrences of the frequency signal that occur during the sampling period.

In another embodiment, the frequency signal can be sampled responsive to the channel detector determining the read command.

In another embodiment, the substitute frequency value determined by the frequency-to-digital converter can be filtered using a filter. The filter can include at least one of a finite impulse response filter, an infinite impulse response filter, a plurality of cascaded infinite impulse response filters, or a second order low pass infinite impulse response filter.

In another embodiment, the sensor interface can be coupled to a serial peripheral interface (SPI) configured to allow a user to change one or more filter coefficients.

In another aspect, a method is provided. In an embodiment, the method can include receiving a frequency signal via a first circuit of a sensor interface. The method can also include determining a substitute frequency value based on a number of edge occurrences of the frequency signal that occur during a sampling period. The substitute frequency value can be determined responsive to a read command provided by a host system on an analog channel associated with a frequency input of the host system. The read command can be provided to an analog-to-digital converter coupled to the sensor interface and to the host system. The method can further include providing the substitute frequency value to the host system coupled to the sensor interface. The substitute frequency value can be provided in place of an analog voltage signal output from the analog-to-digital converter to the host system.

In another embodiment, the frequency signal can be received from a sensor. In another embodiment, the sensor can be a pressure sensor. In another embodiments, the frequency signal is between 20 kHz and 40 kHz. In another embodiment, the sampling period can be between 0.15 milliseconds and 10.00 milliseconds in length.

In another embodiment, the method can further comprise simultaneously incrementing the number of edge occurrences and storing a count of the number of edge occurrences and a time at which each edge occurrence occurs.

In another embodiment, the substitute frequency value can be filtered using a filter. The filter can include at least one of a finite impulse response filter, an infinite impulse response filter, a plurality of cascaded infinite impulse response filters, or a second order low pass infinite impulse response filter.

In another embodiment, the method can further comprise receiving a user input to a serial peripheral interface (SPI) coupled to the sensor interface, the user input configured to change a filter coefficient.

DESCRIPTION OF DRAWINGS

These and other features will be more readily understood from the following detailed description taken in conjunction with the accompanying drawings, in which.

DETAILED DESCRIPTION

Development of new sensor types can lead to obsolescent sensor interfaces that are incompatible with signals generated by the new sensors. It can be common for a host system coupled to sensors to need to support older and newer sensor types. The older and newer sensor types can have different output modalities which may not be supported by the sensor interface of the host system. As a result, software and hardware interfaces of host systems to which the sensors are to be coupled may require significant re-engineering, retrofitting, or even replacement, in order to support signal data generated by newer sensor types. Retrofitting or replacing sensor interfaces to support a broad range of sensor data formats can be cost prohibitive and can require specialized personnel.

Traditional methods to address sensor interface incompatibilities can exacerbate the issue. For example, charge converters can be utilized to convert frequency-based sensor output signals to an analog voltage signal that can be received by an analog-to-digital converter (ADC) of the host system. Utilizing charge converters in this manner can degrade the integrity of the sensor measurement with respect to accuracy, drift, noise, and time response. In some instances, a microprocessor or controller can be used to measure frequency, and subsequently output voltage using a digital-to-analog converter (DAC). This approach can also degrade the accuracy of the measurement signal due to the transition of signal data from digital to analog and back to a digital state again. An improved sensor interface would be desirable to support different sensor output types and to maintain accuracy of a sensor's output signal without requiring replacement of the sensor interface hardware and/or software.

An improved sensor interface system and methods of use are provided herein. The improved sensor interface can be configured to receive a frequency signal output from a pressure sensor and to generate a corresponding signal to be substituted in place of a ADC signal to the host system to which the sensor is coupled. The improved sensor interface and system includes a counter timer circuit configured to calculate frequency of a signal by measuring the time period of a known number of whole input cycles of the signal. The measurement can be carried out periodically, for example 1000, 2000, 3000, 4000, or 5000 times a second. The result can be filtered to enhance the signal fidelity and quality. In some embodiments, the result can be stored as a 16 bit digital vale. The improved sensor interface system can be configured on a semiconductor device, such as a field programmable gate array (FPGA), to detect a READ command from the host system to the ADC for the channel on which the pressure signal is generated. The sensor interface system described herein can process the frequency signal and can substitute a digital value associated with the frequency signal in place of the normal operation of the ADC data stream. All other sensor data conveyed to and/or from the ADC via the sensor interface can be maintained without modification. In this way, the full performance of newer sensor types, such as high-performance frequency sensors used in precision pressure sensing applications, can be relied upon, while simultaneously supporting older sensor types outputting voltage signals. The sensor interface system described herein can allow a legacy system to change from a voltage based sensor to a frequency based sensor without needing to change existing software configurations. Testing and certifying software changes, especially in the aerospace industry can be cost prohibitive and require substantial down time and/or resources.

Figure 1:
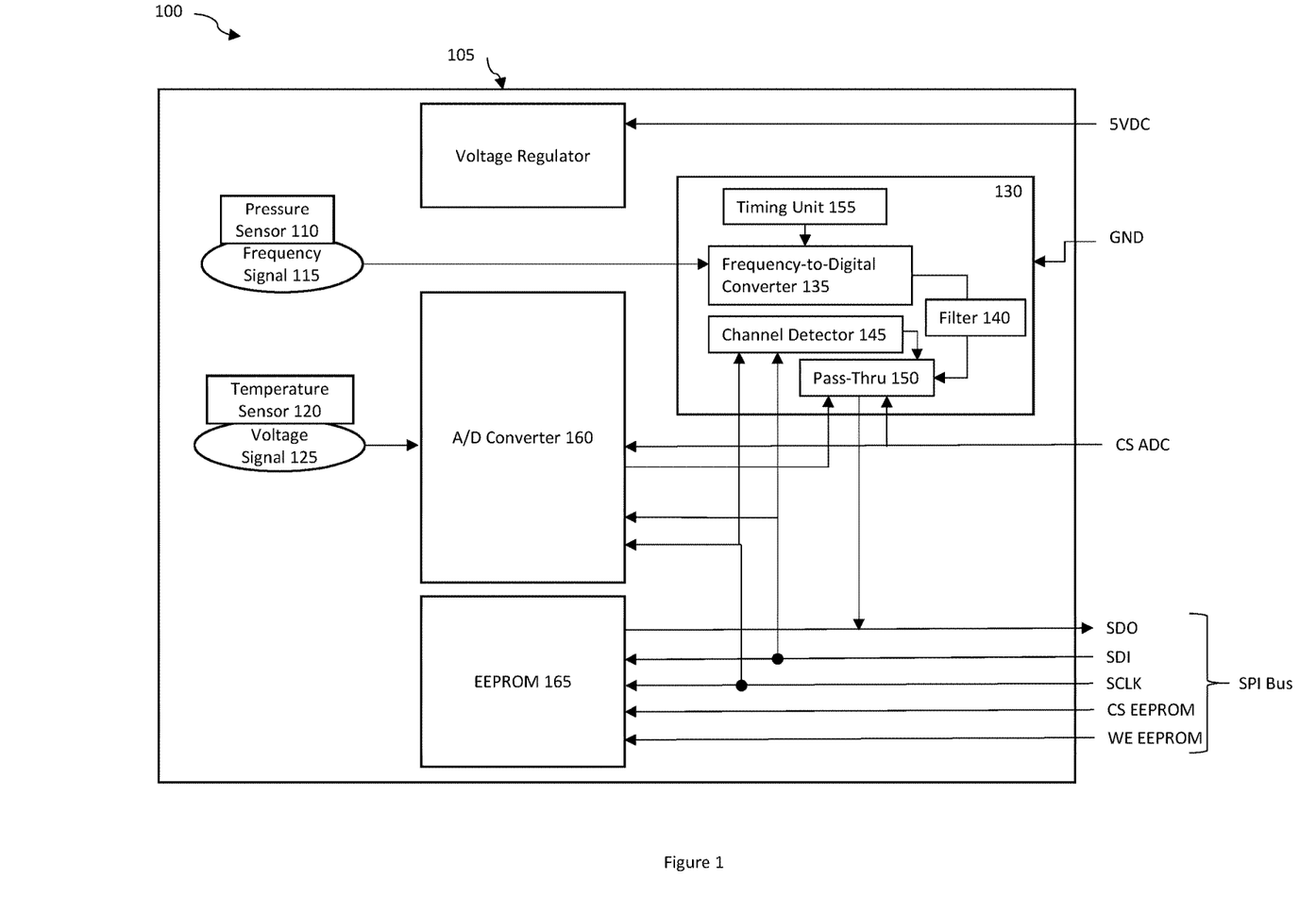
FIG. 1 is a block diagram illustrating an embodiment of a sensor interface system according to some implementations of the current subject matter.

FIG. 1 is a block diagram of an example sensor interface system 100. The sensor interface system 100 can include a host system 105. The host system 105 can include a pressure sensor 110 configured to output a frequency signal 115 indicative of a pressure measured by the pressure sensor 110. The pressure sensor 110 can include a counter timer circuit which can be configured to measure the time period of a known number of whole input pulses to calculate the frequency of the frequency signal the derivative of the number of input pulses occurring over time. The frequency signal 115 can be determined periodically, such as every millisecond and can be filtered to enhance the fidelity of signal 115. The resulting frequency of the signal can be output by the pressure sensor 110 as a 16 bit digital value.

The host system 105 can also include a temperature sensor 120 configured to provide a voltage signal 125 to an ADC 160 configured within the host system 105 for compensation. The voltage signal 125 can be indicative of a temperate measured by the temperature sensor 120. Temperature can cause changes in the frequency and/or voltage characteristics of the temperature sensor 120. By using a look up table or a calibration algorithm, the temperature sensor 120 can provide correction for such effects. In some embodiments, sensor calibration data may be stored in the electrically erasable programmable read-only memory (EEPROM) and be accessed via the serial peripheral interface (SPI) bus.

The frequency signal 115 can be received by a sensor interface 130. In some embodiments, the sensor interface 130 can be configured on an FPGA or similarly suitable semiconductor device including one or more configurable logic blocks connected via programmable interconnects. The sensor interface 130 can include a Frequency-to-Digital converter (FDC) 135 configured to receive the frequency signal 115 output from the pressure sensor 110 and to convert the frequency signal 115 to a digital value. A timing unit 155 or an oscillator (OSC), can provide timing for the circuit sequencing and can act as a time reference. In some embodiments, the timing unit 155 can include a crystal oscillator. The sensor interface 130 can be further configured to monitor digital data provided to and received from the ADC 160.

The sensor interface 130 can receive the frequency signal 115 based on detecting READ calls from the ADC 160 on the channel over which the frequency signal 115 is provided via a Channel Detector 145. Responsive to detecting the frequency signal 115, the sensor interface 130 can block the output of the ADC 160 and can substitute the normal analog channel value with the digital value output by the FDC 135 into the data stream of the ADC 160. The frequency value can be substituted in place of the ADC 160 channel reading. In this way, the host system 105 can exchange data with what appears to be a normal ADC interface, however the host system 105 receives the frequency value that has been substituted in place of an analog voltage signal. Thus the sensor interface 130 can emulate the behavior of a legacy ADC such that the FCD 135 appears as a legacy ADC for at least one channel. In some embodiments, the legacy ADC can be retained so it can continue to provide other analog inputs that are unchanged. In this way, the sensor interface 130 can seamlessly substitute a digital signal corresponding to a frequency input for an analog signal corresponding to a voltage input in a manner that is scaled and filtered to be within parameters of a legacy ADC.

The sensor interface 130 can detect the specific ADC 160 channel read sequence and can respond in a manner to match the ADC 160 characteristics. Thus, the sensor interface 130 is tailored to match the ADC 160 and host system 105 interface characteristics.

The sensor interface 130 also includes a Pass Thru circuit or component 150 configured to provide the determined substitute frequency value and to ensure other channels, such that the values of the voltage signal 125 are processed by the ADC 160 as expected. In this way, legacy interface hardware and software can continue to operate as designed without modification.

In some embodiments, the sensor interface 130 can be configured to provide the frequency measurement and interface control. The frequency measurement and interface control can be supplementary output and inputs to enhance the intended application of the sensor interface 130. For example, in some embodiments, the sensor interface 130 can provide a direct output of frequency (not via the ADC 160). In some embodiments, the sensor interface 130 can provide control of a measurement interface, such as providing the ability to change filtering methods and time periods. In some embodiments, the sensor interface 130 can also provide emulation of the electrically erasable programmable read-only memory (EEPROM). In this way, the use of separate components to perform the emulation can be avoided. In some embodiments, the sensor interface 130 can provide an alternate digital interface, such as a direct inter-integrated circuit (I2C) instead of a serial peripheral interface (SPI).

In some embodiments, the sensor interface 130 can support or retain additional analog channels as needed. For example, the sensor interface 130 can support substitute analog channels without having to emulate the ADC 160.

Figure 2:
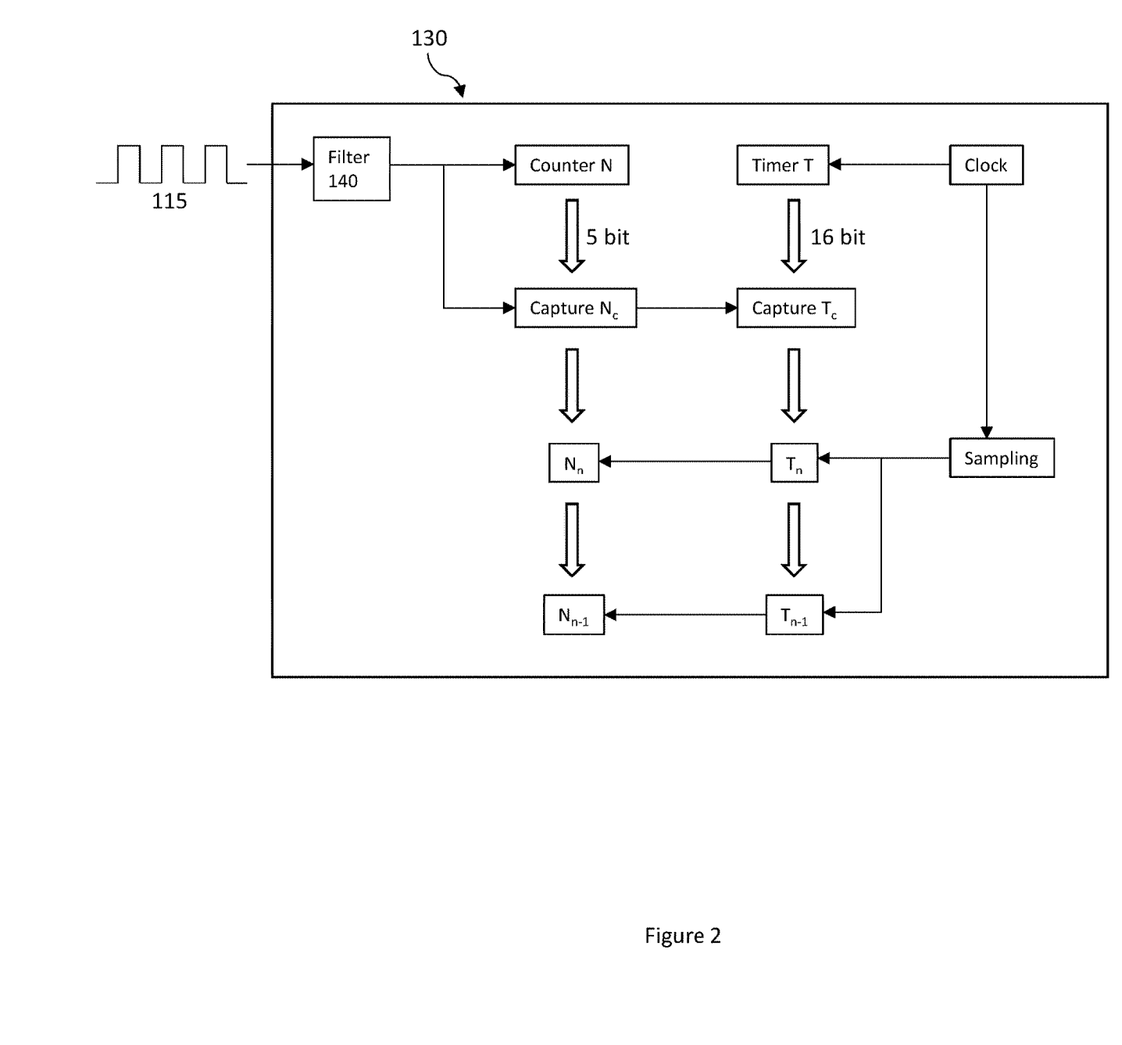
FIG. 2 is a diagram illustrating an embodiment of measuring frequency of signals received via the sensor interface of FIG. 1 according to some implementations of the current subject matter.

FIG. 2 is a diagram illustrating an embodiment of measuring frequency of signals received via the sensor interface 130 of FIG. 1 according to some implementations of the current subject matter. As shown in FIG. 2, the sensor interface 130 can receive signals 115 via a filter 140. Measurement of signals 115 can be performed using a crystal oscillator. The internal timing frequency of the sensor interface 130 can be at least 32 MHz, although in some embodiments other internal timing frequencies can be implemented. In some embodiments, a phase-locked loop of low frequency crystals can be configured in the sensor interface 130. In some embodiments, the range of signals 115 can be between 20 to 40 KHz.

The sensor interface 130 can include a pulse counter N and a timer T. In some embodiments, the resolution of the counter N can 5 bits and the resolution of the time T can be 16-bits. Other resolutions can be configured. The counter N and the timer T can be configured to free run. In some embodiments, signal 115 can be sampled in a manner that is synchronized to fastest timer clock. Filter 140 can include an edge filter so that the output transition to 1 or 0 can only occur after a predefined or user configured number of consecutive, whole input samples of signal 115 are received at a level associated with the edge filter configuration. For example, the filter 140 can be configured to ignore less than three consecutive, whole signals 115.

Referring to FIG. 2, the sensor interface 130 can be configured such that on each negative edge of the filtered input waveform, the counter N will be incremented N=N+1 and the counter and the timer value will be simultaneously captured into counter register $N_c$ (e.g., Capture $N_c$) and timer register $T_c$ (e.g., Capture $T_a$). In some embodiments, the capture is performed before the counter N and/or the time T increment. In some embodiments, the capture is performed after the counter N and/or the time T increment. Value capture can continue uninterrupted. In some embodiments, the output sampling period can be 0.25 ms, for example, 8000 clock cycles or 4000 times per second. At a given sample time, the current state of the counter register ($N_e$) and the timer register ($T_a$) can be simultaneously transferred to double buffered registers $N_c$ (e.g., the counter buffered register) and $T_n$ (e.g., the timer buffered register). The prior contents of the double buffered registers can be transferred to registers Nn−1 and Tn−1.

In some embodiments, the pulse or count changes and the time period changes can be calculated as the count difference between successive readings using unsigned modulo 16 arithmetic. The calculations can be performed based on the relationship defining Frequency=($N_n$−Nn−1)/($T_n$−Tn−1) *Time. However, to enhance resolution and support fixed point arithmetic, the value can be scaled as follows:

$F_1$=(Frequency−20.8333 KHz)/20.8333 KHz*216. In some embodiments, the result can be a signed 16-bit value. This can be performed as follows, for example where constant $K_1$ can be used to match the signal range of sensor and to decrease divider size:

$$K_1=32e6/20.833e3=1536(600_H).$$

$X_1$=($N_n$−Nn−1)*K1−($T_n$−Tn−1). For example, this can be a 14 bit subtract with 13-bit result $X_2$=$X_1$*K2/($T_n$−Tn−1)−K3.

$K_2$=216. For example, this value can provide a 16 bit result using ~32 bit/16 bit divide.

$K_2$=220. For example, this value can provide a ~22 bit result from ~36 bit/16 bit divide.

$K_3$ can provide adjustment of sensor range to maximize use of a 16 bit result without overflow. In some embodiments, binary values such as $0_H$, $8000_H$, $4000_H$ or 2000H can be used. The binary values can correlate to respective offsets of ~10.4 KHz, 5 KHz and 2.5 KHz.

In some embodiments, the foregoing calculations can be performed based on a 32 Mhz clock, although other clock frequencies can be configured to change scaling factors and to provide greater customization of the sensor interface 130. For example, in some embodiments, a resolution higher than 16 bits can be desirable for auxiliary output registers. In some embodiments, the result can be a 22 bit result that can be subsequently right shifted to be configured as a 16 bit result.

The calculations described in relation to FIG. 2 can be performed based on one or more exceptions. For example, if the sampling shows no increase in time values (i.e. $T_n$−Tn−1=0), the frequency input can be determined to be abnormally low. An abnormally low input can include, for example, no captures in a 0.25 ms window. In such cases, $X_2$ can be set to zero. In some embodiments, an exception can be implemented by directly checking for capture events in a sampling window.

In some embodiments, if the subtraction during the calculation of $X_1$ results in underflow, the $X_2$ value can be set to zero. In some embodiments, if the calculation of $X_1$ results in a value exceeding 8191 (or 13 bits), the $X_2$ value can be set at 65535. In some embodiments, if the calculation of $X_2$ overflows 16 bits, the $X_2$ value can be set at 65535. When the exception above no longer apply, normal calculation will resume.

Figure 3:
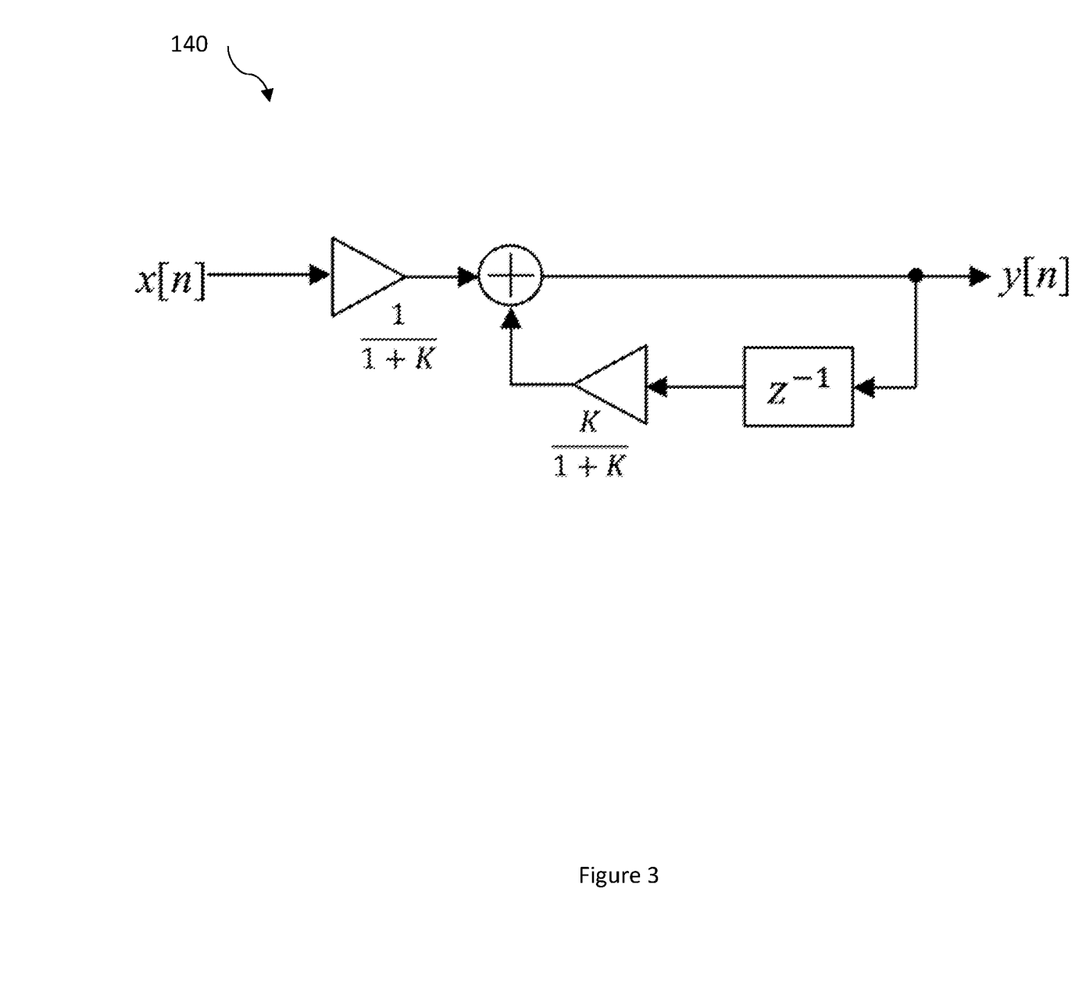
FIG. 3 is a diagram illustrating a first embodiment of a filter configured in the sensor interface of FIG. 1 according to some implementations of the current subject matter.

FIG. 3 is a diagram illustrating a first embodiment of a filter configured in the sensor interface 130 of FIG. 1 according to some implementations of the current subject matter. In some embodiments, the filter 140 can include a digital filter to filter signal 115. The output of the filter 140 can be the value output to a channel coupled to an ADC, such as ADC 160 of FIG. 1.

In some embodiments, the filter 140 can be configured without down sampling and the filter output can be calculated every 0.25 ms (based on 8000 divider and 32 MHz clock settings). In some embodiments, serialization of the filter operations can be provided.

The design and/or selection of filter 140 can be based on a required device size and/or computing capacity. In one embodiment, the filter 140 can include a finite impulse response (FIR) filter. The 16 bit result $X_2$ can be passed to an FIR filter of length n=64. Coefficients can be symmetrical for linear phase and 32 bit MAC and 64 bit storage registers can be implemented.

In a second embodiment, a FIR filter 140 can include a simpler SINC2 (Bartlett) filter implemented using two cascaded integrator-comb (CIC) filter stages of length 32 bits. In some embodiments, the CIC filters 140 can compute moving averages and can be implemented using a 22-bit integrator that can truncated to give a 16-bit result. In this embodiment, no multipliers may be required, while 2 adders and 64×16 bit storage registers can be used to implement the filter 140.

In some embodiments, it can be desirable to adjust filter length to lower values. For example, in FIG. 3, an embodiment of a first order infinite impulse response (IIR) filter that can be configured as filter 140 in the sensor interface 130 of FIG. 1 is shown. As shown in FIG. 3, two cascaded first order IIR filters can be configured as filter 140. This embodiment can include 4 multipliers, 2 adders, and 2 registers. In some embodiments, simple binary multiplicands can be configured. This embodiment of the filter 140 can require additional resolution to maintain 16-bit performance.

Figure 4:
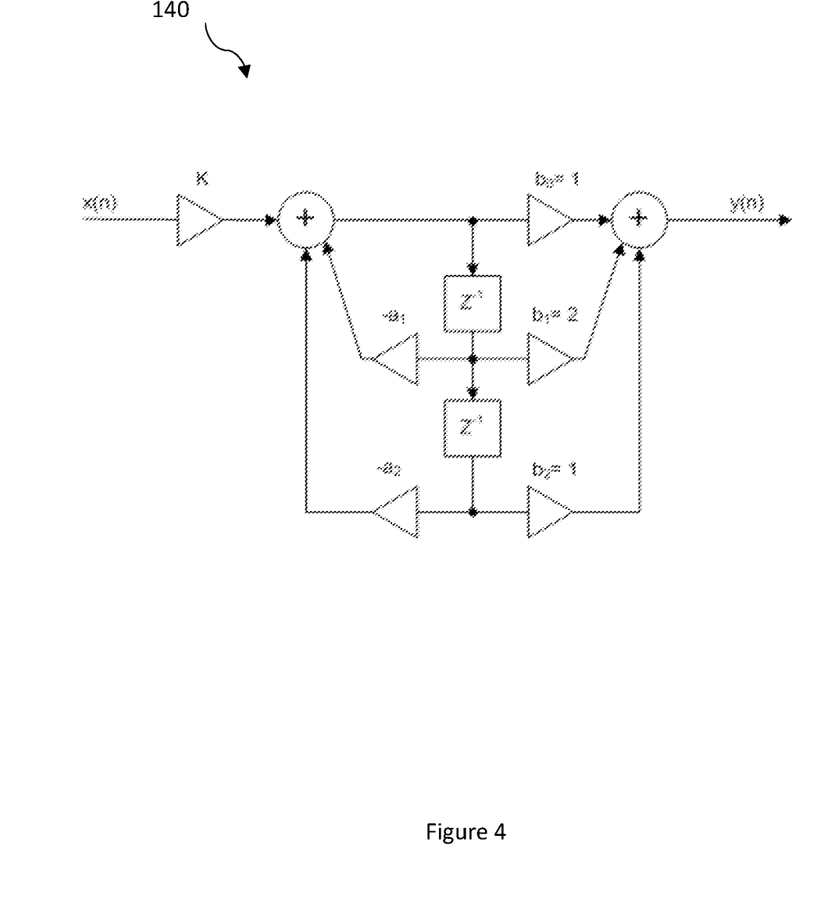
FIG. 4 is a diagram illustrating a second embodiment of a filter configured in the sensor interface of FIG. 1 according to some implementations of the current subject matter.

FIG. 4 is a diagram illustrating a second embodiment of a filter configured in the sensor interface 130 of FIG. 1 according to some implementations of the current subject matter. In some embodiments, the filter 140 can include a second order IIR filter, such as a BiQuad filter. In this embodiment, the filter can include 3 multipliers, 2 or 4 adders, and two storage registers. In this embodiment, the profile of the filter 140 can be a Butterworth or Bessel configuration. This embodiment can utilize additional resolution to avoid overflow and maintain 16-bit output resolution, for example 32 bit data path and registers can be required. The multiplier can use Q1.15 fixed point arithmetic with fixed coefficients $a_1$, a2, where $K=(1+a_1+a_2)/4$.

Figure 5:
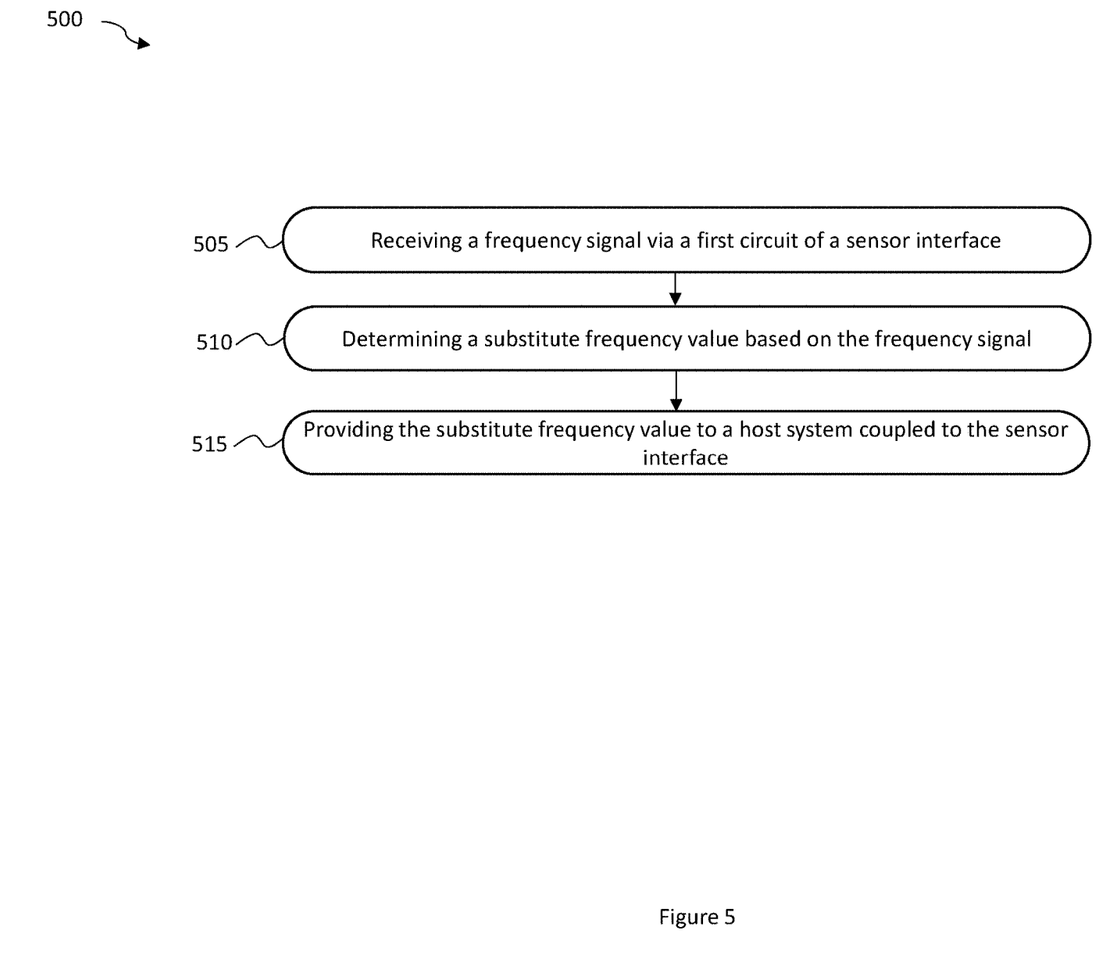
FIG. 5 is a process flow chart illustrating an embodiment of a method for providing a substitute frequency value using the sensor interface of FIG. 1 according to some implementations of the current subject matter It is noted that the drawings are not necessarily to scale. The drawings are intended to depict only typical aspects of the subject matter disclosed herein, and therefore should not be considered as limiting the scope of the disclosure.

FIG. 5 is a process flow chart illustrating an embodiment of a method for providing a substitute frequency value using the sensor interface system of FIG. 1 according to some implementations of the current subject matter. As shown in method 500, the sensor interface 130 can determine and provide a substitute frequency value to a host system, such as host system 105. At 505, the sensor interface 130 can receive a frequency signal via a first circuit. The first circuit can couple a sensor, such as pressure sensor 110 to the sensor interface 130.

At 510, the sensor interface 130 can determine a substitute frequency value based on the frequency signal. The substitute frequency value can be determined using the calculations described in relation to FIG. 2 and/or the filters 140 described in relation to FIGS. 3 and 4.

At 515 the sensor interface 130 can provide the substitute frequency value to a host system 105 coupled to the sensor interface 130. The pass-thru circuit 150 can be configured in the host system 105 to substitute the measured $F_1$ value in place of a data stream of ADC converter 160. Specifically, when the host system 105 reads the analog channel of ADC 160 associated with the F value. In normal operation the ADC 160 can operates with full pass through of SPI data and clock from the host system 105. However, when the channel detector 145 detects the sequence corresponding to F channel read, it interrupts the pass-thru circuit 150 and substitutes the digital value $F_1$ in place of the normal analog channel value. In some embodiments, the value from the ADC 1650 can be stored or can be discarded. All other channels and operation of ADC 160 can operate normally with normal data pass through.

Additional embodiments of the sensor interface 130 can be provided. For example, the edge filtered input signal 115 can be made available as an output signal. In some embodiments, the sensor interface 130 can be configured to add additional delay as needed.

In another embodiment, calculation of values for $X_2$, F1, N, and T can be available via a dedicated SPI interface, such as the SPI Bus shown in FIG. 1. In some embodiments, a separate chip set can be used from the SPI Busto support channel substitution at ADC 160.

In another embodiment, filter coefficients can be changed from their default values using the SPI Bus of FIG. 1 or via discrete input signals. Since a limited number of filter settings are needed, discrete input signal selection can be used. In some embodiments, the SPI Bus can be used to change other parameters associated with the FDC 135. For example, the SPI Bus can be configured to change the duration of the sampling period.

Exemplary technical effects of the methods, systems, and computer-readable medium described herein include, by way of non-limiting example, providing a sensor interface system capable of supporting differing sensor output signal modalities without requiring hardware or software retrofitting or reconfiguration. Specifically, the sensor interface system described herein can receive frequency-based signals output from a first sensor, such as a pressure sensor, while also receiving voltage-based signals output from a second sensor. When coupled to a ADC of a host system, the sensor interface described herein can expand the operation of the host system for a larger variety of sensor types and output signal modalities. The sensor interface system described herein can provide more accurate measurement of frequency signals without requiring additional processing to convert the frequency signal to a voltage signal and can thus enable more robust operation of a wider range of sensor types and industrial equipment being monitored by the sensors.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the systems and subject matter described herein can be implemented using, special purpose logic circuitry, e.g., an FPGA (field programmable gate array), an ASIC (application-specific integrated circuit), a gate array, or a CPLD (complex programmable logic device).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, can be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language can correspond to the precision of an instrument for measuring the value. Here and throughout the specification and claims, range limitations can be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A system comprising:
    a first circuit configured to receive a frequency signal from at least one frequency sensor;
    an analog-to-digital converter (ADC) configured to receive at least one analog signal from at least one voltage sensor and convert the at least one analog signal into a digital data stream comprising at least one digital value to be sent to a host system;
    a sensor interface coupled to the first circuit and communicatively coupled to the ADC, wherein the sensor interface is configured to determine a substitute digital data stream comprising at least one substitute frequency value associated with the frequency signal based on a number of edge occurrences of the frequency signal that occur during a sampling period, wherein the substitute digital data stream is determined responsive to a read command provided by the host system, the read command provided on an analog channel associated with a frequency input of the host system, the read command provided to the ADC; and
    a second circuit coupled to the sensor interface, configured to block the digital data stream corresponding to the at least one analog signal from the at least one voltage sensor that is output from the ADC responsive to determining the read command, and configured to provide the substitute digital data stream corresponding to the frequency signal from the at least one frequency sensor the sensor interface to the host system, wherein the substitute digital data stream is provided in place of the digital data stream output from the ADC to be sent to the host system.

2. The system of claim 1, wherein the at least one frequency sensor is a pressure sensor.

3. The system of claim 1, wherein the sensor interface is configured on a FPGA, an ASIC, a gate array, or a CPLD.

4. The system of claim 1, wherein the frequency signal is between 20 kHz and 40 kHz.

5. The system of claim 1, wherein the system comprises the ADC and the sensor interface comprises:
    a timing unit providing a timing signal;
    a frequency-to-digital converter receiving the frequency signal and the timing signal;
    a channel detector circuit configured to determine the read command, and configured to block the digital data stream being sent to the host system responsive to determining the read command; and
    a pass thru circuit configured to provide the substitute digital data stream to the second circuit responsive to the channel detector circuit blocking the digital data stream being sent to the host system.

6. The system of claim 5, wherein the frequency-to-digital converter samples the frequency signal during a sampling period included in the timing signal and determines the at least one substitute frequency value based on a duration of time corresponding to a number of edge occurrences of the frequency signal that occur during the sampling period.

7. The system of claim 6, wherein the frequency signal is sampled responsive to the channel detector determining the read command.

8. The system of claim 6, the at least one substitute frequency value determined by the frequency-to-digital converter is filtered using a filter, the filter including at least one of a finite impulse response filter, an infinite impulse response filter, a plurality of cascaded infinite impulse response filters, or a second order low pass infinite impulse response filter.

9. The system of claim 8, wherein the sensor interface is coupled to a serial peripheral interface (SPI) configured to allow a user to change one or more filter coefficients.

10. A method comprising:
    receiving a frequency signal from at least one frequency sensor via a first circuit of a sensor interface, the sensor interface communicatively coupled to an analog-to-digital converter (ADC) configured to receive at least one analog signal from at least one voltage sensor and convert the at least one analog signal into a digital data stream comprising at least one digital value to be sent to a host system;
    determining, by the first circuit, a substitute digital data stream comprising at least one substitute frequency value associated with the frequency signal based on a number of edge occurrences of the frequency signal that occur during a sampling period, wherein the substitute digital data stream is determined responsive to a read command provided by the host system on an analog channel associated with a frequency input of the host system, the read command provided to the ADC;
    blocking, by a second circuit coupled to the sensor interface, the digital data stream corresponding to the at least one analog signal from the at least one voltage sensor that is output from the ADC responsive to the read command; and
    providing, by the second circuit, the substitute digital data stream corresponding to the frequency signal from the at least one frequency sensor to the host system coupled to the sensor interface, wherein the substitute digital data stream is provided in place of the digital data stream output from the ADC to be sent to the host system.

11. The method of claim 10, wherein the at least one frequency sensor is a pressure sensor.

12. The method of claim 10, wherein the frequency signal is between 20 kHz and 40 kHz.

13. The method of claim 10, wherein the sampling period is between 0.15 milliseconds and 10.00 milliseconds in length.

14. The method of claim 10, further comprising simultaneously incrementing the number of edge occurrences and storing a count of the number of edge occurrences and a time at which each edge occurrence occurs.

15. The method of claim 10, wherein the at least one substitute frequency value is filtered using a filter, the filter including at least one of a finite impulse response filter, an infinite impulse response filter, a plurality of cascaded infinite impulse response filters, or a second order low pass infinite impulse response filter.

16. The method of claim 10, further comprising receiving a user input to a serial peripheral interface (SPI) coupled to the sensor interface, the user input configured to change a filter coefficient.

17. The method of claim 10, further comprising:
    determining, by the sensor interface, a read command provided by the host system on an analog channel associated with a frequency input of the host system; and sampling, by the first circuit, the frequency signal responsive to the channel detector determining the read command.

18. The method of claim 17 wherein the read command is determined by a channel detector circuit within the sensor interface, and the digital data stream output from the ADC is blocked by the channel detector circuit of the sensor interface.

* * * * *